(12) United States Patent
Ogura et al.

(10) Patent No.: US 11,660,660 B2
(45) Date of Patent: May 30, 2023

(54) FOUNDRY SAND SUPPLY DEVICE, FOUNDRY SAND INSPECTION SYSTEM, AND FOUNDRY SAND COLLECTION METHOD

(71) Applicant: SINTOKOGIO, LTD., Nagoya (JP)

(72) Inventors: Yuichi Ogura, Toyokawa (JP); Yasuaki Asaoka, Toyokawa (JP); Hisashi Harada, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 253 days.

(21) Appl. No.: 16/994,821

(22) Filed: Aug. 17, 2020

(65) Prior Publication Data

US 2021/0053107 A1 Feb. 25, 2021

(30) Foreign Application Priority Data

Aug. 20, 2019 (JP) .............................. JP2019-150470

(51) Int. Cl.
*B22C 5/08* (2006.01)
*B65G 17/12* (2006.01)
*B65G 17/36* (2006.01)

(52) U.S. Cl.
CPC .............. *B22C 5/08* (2013.01); *B65G 17/126* (2013.01); *B65G 17/36* (2013.01)

(58) Field of Classification Search
CPC .... B22C 5/00; B22C 5/08; B22C 5/16; B22C 5/18; B65G 17/12; B65G 17/126; B65G 17/36; B65G 17/48
USPC ...................................... 164/456, 5, 412, 192
See application file for complete search history.

(56) References Cited

U.S. PATENT DOCUMENTS 1,526,074 A * 2/1925 Minich ................. B22C 5/0495
241/301
1,948,805 A * 2/1934 Simpson ............... B22C 5/0463
366/153.3

FOREIGN PATENT DOCUMENTS

JP S62-162649 U 10/1987

* cited by examiner

*Primary Examiner* — Kevin P Kerns
(74) *Attorney, Agent, or Firm* — Faegre Drinker Biddle & Reath LLP (57) ABSTRACT

Provided is a foundry sand supply device capable of collecting foundry sand at an arbitrary timing. The foundry sand supply device includes a bucket collecting the foundry sand, a bucket drive unit rotatably supporting the bucket and driving the bucket, and a moving unit moving the bucket drive unit close to and away from the foundry sand, and moving the bucket drive unit between a collecting position to collect the foundry sand and a supply position to supply the foundry sand.

16 Claims, 7 Drawing Sheets

FOUNDRY SAND SUPPLY DEVICE, FOUNDRY SAND INSPECTION SYSTEM, AND FOUNDRY SAND COLLECTION METHOD

CROSS-REFERENCE TO RELATED APPLICATION

This application is based on Japanese Patent Application No. 2019-150470 filed with Japan Patent Office on Aug. 20, 2019, the entire contents of which are hereby incorporated by reference.

TECHNICAL FIELD

The present disclosure relates to a foundry sand supply device, a foundry sand inspection system, and a foundry sand collection method.

BACKGROUND

Japanese Unexamined Utility Model Publication No. S62-162649 discloses a device that collects foundry sand. This device includes an arm that rotates about a rotation fulcrum in both forward and reverse directions, and a bucket provided in a tip portion of the arm. The bucket is located in a sand layer of flowing collected sand by a belt conveyor. The arm rotates forward in a state where the collected sand is scooped with the bucket. By the forward rotation of the arm, the bucket is conveyed above a storage box, and an opening of the bucket is turned downward. Consequently, the collected sand in the bucket is thrown into the storage box.

SUMMARY

In a device described in Patent Literature 1, flowing collected sand by a belt conveyor is received by a bucket, so that the collected sand is passively stored in the bucket. Consequently, there is concern that a sufficient amount of collected sand cannot be collected depending on an operation state of the belt conveyor.

The present disclosure provides a foundry sand supply device that can collect foundry sand at an arbitrary timing.

An aspect of the present disclosure is a foundry sand supply device. This device includes a bucket, a bucket drive unit, and a moving unit. The bucket collects foundry sand. The bucket drive unit rotatably supports the bucket and drives the bucket. The moving unit linearly moves the bucket drive unit close to and away from the foundry sand, and moves the bucket drive unit between a collecting position to collect the foundry sand and a supply position to supply the foundry sand.

In the foundry sand supply device according to the aspect of the present disclosure, the bucket is driven by the bucket drive unit rotatably supporting the bucket. Then, the bucket is moved close to and away from the foundry sand together with the bucket drive unit by the moving unit, and moves between the collecting position and the supply position. Consequently, this foundry sand supply device not only includes the moving unit moving the bucket between the collecting position and the supply position but also includes the bucket drive unit driving the bucket itself, and hence the foundry sand can be actively collected. Consequently, this foundry sand supply device can collect the foundry sand at an arbitrary timing irrespective of a conveying state of the foundry sand.

In an embodiment, the bucket may collect the foundry sand disposed on a conveyor. In this case, the foundry sand supply device can not only receive, with the bucket, the foundry sand moved by the conveyor being operated but also collect the foundry sand on the conveyor where conveyance is interrupted.

The embodiment may include a control unit controlling operations of the bucket drive unit and the moving unit. The control unit may obtain operation information of the conveyor, and operate the bucket drive unit and the moving unit based on the operation information during interruption of conveyance of the conveyor. In this case, the foundry sand supply device can collect the foundry sand also during the interruption of the conveyance of the conveyor.

In the embodiment, the bucket drive unit may be a cylinder driving a rod. The bucket may be supported by a tip of the rod. In this case, the foundry sand supply device can drive the cylinder to rotate the bucket.

In the embodiment, the foundry sand supply device may include a blower outputting a gas toward an interior of the bucket. In this case, the foundry sand supply device can remove the sand adhering to the interior of the bucket with the gas.

In the embodiment, the moving unit may move the bucket drive unit to the supply position, and the bucket drive unit may drive the bucket at the supply position to supply the foundry sand to a sand throw port of an external device. In this case, the foundry sand supply device can supply the collected sand to the external device.

Another aspect of the present disclosure is a foundry sand inspection system. The foundry sand inspection system includes an inspection device and a foundry sand supply device. The inspection device includes a chute and an inspection unit. The chute includes a sand throw port and a sand discharge port located under the sand throw port. The inspection unit is connected to the sand discharge port of the chute, and inspects properties of foundry sand dropped from the chute. The foundry sand supply device includes a bucket, a bucket drive unit, and a moving unit. The bucket collects the foundry sand. The bucket drive unit rotatably supports the bucket and drives the bucket. The moving unit linearly moves the bucket drive unit close to and away from the foundry sand, and moves the bucket drive unit between a collecting position to collect the foundry sand and a supply position to supply the foundry sand to the sand discharge port of the chute.

In the foundry sand inspection system according to the other aspect of the present disclosure, the foundry sand is thrown into the sand throw port of the chute and discharged through the sand discharge port by the foundry sand supply device. The discharged foundry sand is supplied to the inspection unit, and the properties of the foundry sand are inspected. The bucket is driven by the bucket drive unit rotatably supporting the bucket. Then, the bucket is moved close to and away from the foundry sand together with the bucket drive unit by the moving unit, and moves between the collecting position and the sand throw port of the chute. In this way, this foundry sand inspection system not only includes the moving unit moving the bucket between the collecting position and the sand throw port of the chute but also includes bucket drive unit driving the bucket itself, and hence the foundry sand can be actively collected. Consequently, this foundry sand inspection system can collect the foundry sand at an arbitrary timing irrespective of a conveying state of the foundry sand.

In an embodiment, the chute may include an opening/closing gate in the chute. The opening/closing gate may include a receiving surface receiving the dropped foundry sand, and may be rotatably supported about a rotary shaft extending along and within a plane of the receiving surface. The opening/closing gate may receive part of the foundry sand when in a horizontal posture, and pass remaining foundry sand through the sand discharge port of the chute. In this case, even if the foundry sand is conveyed with the bucket at once, the foundry sand inspection system can inspect the foundry sand two divided times.

In the embodiment, the inspection device may include a sand loosening mechanism loosening the foundry sand before the foundry sand is supplied to the inspection unit. In this case, the foundry sand inspection system can supply the foundry sand including fewer lumps (lumps of sand) to the inspection device.

Still another aspect of the present disclosure is a foundry sand collection method. This method is a method of collecting foundry sand conveyed by a conveyor. The method includes putting a bucket to collect the foundry sand on standby at a position away from the foundry sand, obtaining operation information of the conveyor, determining, based on the operation information of the conveyor, whether the conveyance of the foundry sand by the conveyor is interrupted, and linearly moving the bucket from a position at which the bucket is on standby to a position to collect the foundry sand and collecting the foundry sand when it is determined that the conveyance of the foundry sand by the conveyor is interrupted. According to the other aspect of the present disclosure, the foundry sand can be collected even during the interruption of the conveyance of the conveyor.

According to the present disclosure, foundry sand can be collected at an arbitrary timing.

DETAILED DESCRIPTION

Hereinafter, an embodiment will be described with reference to the drawings. Note that in the following description, the same or corresponding element is denoted with the same reference sign, and redundant description will not be repeated.

(Configuration of Foundry Sand Supply Device)

Figure 1:
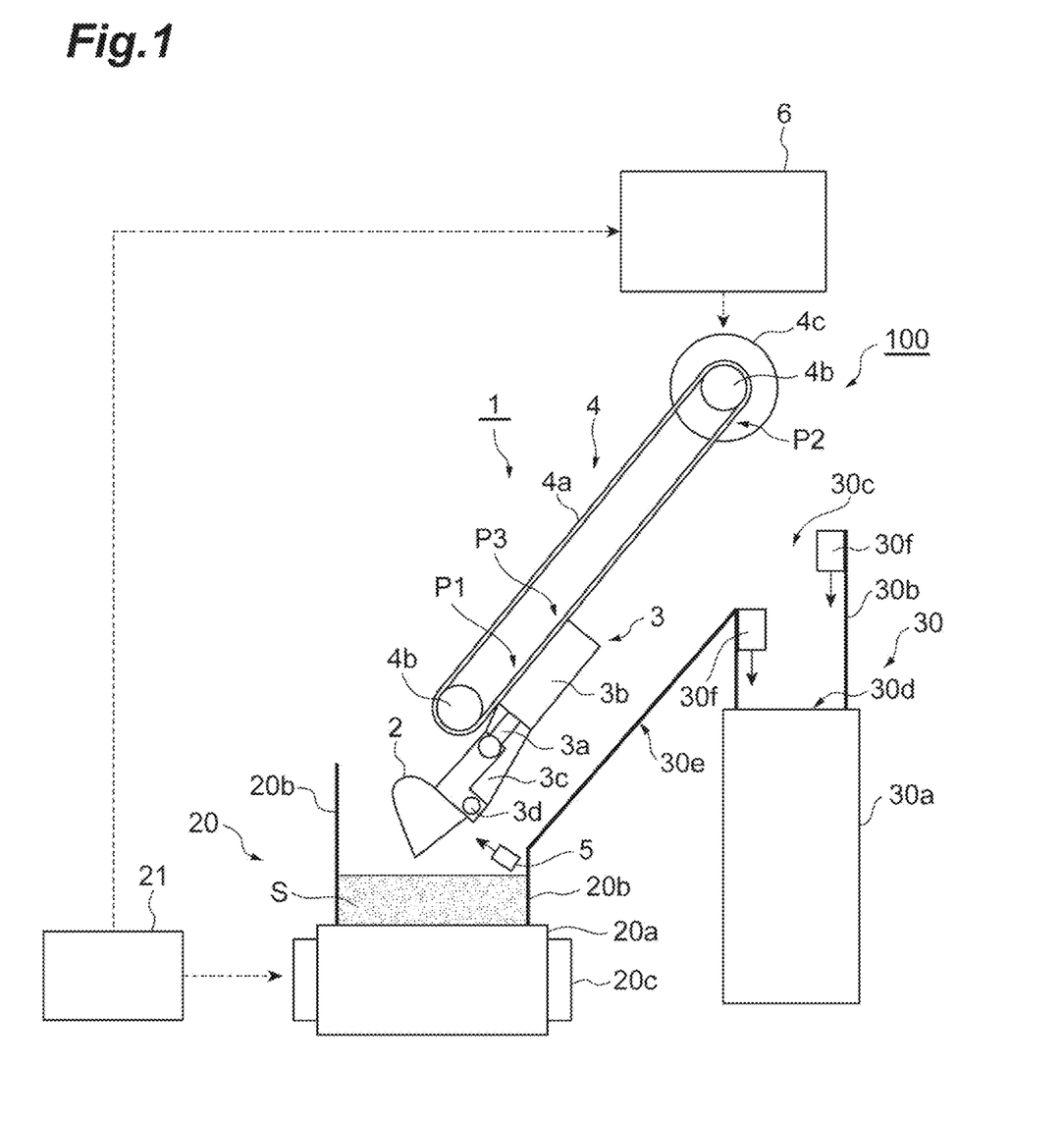
FIG. 1 is a view showing an example of a configuration of a foundry sand supply device according to an embodiment.

FIG. 1 is a view showing an example of a configuration of a foundry sand supply device according to an embodiment. A foundry sand supply device 1 shown in FIG. 1 is a device that collects foundry sand S (green sand in the present embodiment), and supplies the collected foundry sand S to a predetermined supply destination. The predetermined supply destination can be arbitrarily set. Details of the supply destination will be described later.

As shown in FIG. 1, the foundry sand supply device 1 includes a bucket 2, a bucket drive unit 3, and a moving unit 4. The bucket 2 is a container to collect the foundry sand S. The bucket 2 includes an opening, and receives foundry sand through the opening in the bucket. The bucket 2 is supported by the bucket drive unit 3.

The bucket drive unit 3 rotatably supports the bucket 2 and drives the bucket 2. An example of the bucket drive unit 3 is a cylinder that drives a rod, and the bucket 2 is supported at a tip of the rod. As a more specific example, the bucket drive unit 3 includes a stick-like rod 3a extending and retreating in a forward-backward direction, and a cylinder body 3b including a drive source that drives the rod 3a. The cylinder body 3b includes a fixed member 3c extending to a rod 3a side, and fixed to the cylinder body 3b. The fixed member 3c is provided with a rotary shaft 3d, and the bucket 2 is rotatably attached to the rotary shaft 3d. The bucket 2 is attached to the tip of the rod 3a. When the rod 3a extends and retreats, the bucket 2 rotates about the rotary shaft 3d as a fulcrum. There are not any special restrictions on a drive mechanism of the cylinder, and the mechanism may be any one of pneumatic, hydraulic and electric mechanisms. The bucket drive unit 3 may be a rotary cylinder (a rotary actuator). Alternatively, the bucket drive unit 3 may be a drive mechanism comprising a motor, a chain, a belt, a pulley and the like.

The bucket drive unit 3 is supported by the moving unit 4. The moving unit 4 moves the bucket drive unit 3 close to and away from the foundry sand S. The moving unit 4 includes a chain 4a connected to the bucket drive unit 3, sprockets 4b connected to the chain 4a, and a motor 4c that applies rotating power to the sprockets. The motor 4c rotates, to rotate the chain 4a via the sprockets 4b, and the bucket drive unit 3 moves close to and away from the foundry sand S.

The moving unit 4 linearly moves the bucket drive unit 3 between a collecting position P1 to collect the foundry sand S and a supply position P2 to supply the foundry sand S. Linearly moving means moving on a straight trajectory, and here means moving along a straight line connecting the collecting position P1 and the supply position P2. The collecting position P1 is a position at which the bucket 2 can collect the foundry sand S, and is set in advance. The supply position P2 is a position at which the bucket 2 can supply the foundry sand S, and is set in advance. A standby position P3 may be set between the collecting position P1 and the supply position P2. The standby position P3 is a position at which the bucket 2 is on standby. When the bucket drive unit 3 moves, the bucket 2 moves between the position at which the foundry sand S can be collected and the position at which the foundry sand S can be supplied. Note that the moving unit 4 is supported by an unshown support member. The moving unit 4 may include an unshown guide member, to guide the bucket drive unit 3 in a moving direction. The moving unit 4 is not limited to the above drive mechanism, and may be a drive mechanism in which a pneumatic cylinder, a hydraulic cylinder or an electric cylinder is used.

The foundry sand supply device 1 may include a blower 5 that outputs a gas toward an interior of the bucket 2. An example of the blower 5 is provided near the position at which the bucket 2 can collect the foundry sand S. The blower 5 outputs the gas, such as air, toward the interior of the bucket 2, and removes the foundry sand S adhering to an inner wall of the bucket 2.

Respective elements constituting the foundry sand supply device 1 described above may be controlled by a control unit 6. The control unit 6 is constituted of, for example, a general purpose computer including a computing device such as a central processing unit (CPU), a storage unit such as a read only memory (ROM), a random access memory (RAM), or a hard disk drive (HDD), a communication device, and others, or a programmable logic controller (PLC), a relay, a power source, and the like. The control unit 6 is connected to the bucket drive unit 3 and the moving unit 4, and controls operations of the bucket drive unit 3 and the moving unit 4. For example, the control unit 6 drives the moving unit 4 to move the bucket drive unit 3 to the collecting position P1, and drives the bucket drive unit 3 to rotate the bucket 2. The bucket drive unit 3 rotates the bucket 2 in a direction in which the opening of the bucket 2 approaches the foundry sand S. Consequently, the bucket 2 collects the foundry sand S. The control unit 6 drives the moving unit 4 to move the bucket drive unit 3 to the supply position P2, and drives the bucket drive unit 3 to rotate the bucket 2 in which the foundry sand S is received. The bucket drive unit 3 rotates the bucket 2 so that the opening of the bucket 2 turns downward. Consequently, the bucket 2 supplies the foundry sand S to the supply destination. The control unit 6 may be connected to the blower 5, and operate the blower 5 at a predetermined timing. The control unit 6 causes the bucket drive unit 3 to collect the foundry sand S at the collecting position P1, moves the bucket drive unit 3 to the supply position P2 to throw the foundry sand S into the supply destination, and operates the blower 5 at a timing when the bucket drive unit 3 returns to the standby position P3. The control unit 6 may operate the blower 5 just before the collection of the foundry sand S by the bucket 2. Consequently, the interior of the bucket 2 is cleaned prior to the collection.

The foundry sand supply device 1 collects, for example, the foundry sand S that is present on a conveyance path. The foundry sand S is disposed on a conveyor 20 as an example. An example of the conveyor 20 is a belt conveyor. The conveyor 20 includes a belt 20*a* forming the conveyance path of the foundry sand S. Side walls 20*b* are provided on sides of a top face of the belt 20*a*, and prevent dropping of the foundry sand S. The belt 20*a* is wound around a pulley 20*c*, and the pulley 20*c* is rotated, to rotate the belt 20*a* and convey the foundry sand S. A drive source that drives the pulley 20*c* is controlled by a conveyance control unit 21. The control unit 6 may receive operation information from the conveyance control unit 21, and determine a conveying state of the foundry sand S.

The foundry sand supply device 1 supplies the foundry sand S to an external device 30 as an example. There are not any special restrictions on the external device 30 as long as the device utilizes the foundry sand S. Examples of the external device 30 include an inspection device that inspects the foundry sand S, a molding machine in which the foundry sand S is used, and a kneading machine. There are not any special restrictions on a type of inspection of the inspection device, a type of product of the molding machine, sand that is a target of the kneading machine, and the like, and an arbitrary inspection device, molding machine or kneading machine can be employed as the external device 30.

The foundry sand supply device 1 supplies the foundry sand S to, for example, a chute 30*b* provided in a top of a processing unit 30*a* of the external device 30. The chute 30*b* is a cylindrical member, and includes a sand throw port 30*c* and a sand discharge port 30*d* located under the sand throw port 30*c*. The processing unit 30*a* is connected to the sand discharge port 30*d* of the chute 30*b*, and utilizes the foundry sand S dropped through the chute 30*b*. For example, in case where the external device 30 is the inspection device, the processing unit 30*a* is an inspection unit that inspects the foundry sand S. In case where the external device 30 is the molding machine, the processing unit 30*a* is a molding machine body including a mold. In case where the external device 30 is a kneading machine, the processing unit 30*a* is a kneading machine body including a kneading container. During the conveyance of the foundry sand S by the foundry sand supply device 1, the chute 30*b* may include a connecting part 30*e* connecting the sand throw port 30*c* to the side wall 20*b* of the conveyor 20 to receive the foundry sand S dropped from the bucket 2. The chute 30*b* may include a blower 30*f* that outputs a gas from the sand throw port 30*c* toward the sand discharge port 30*d*.

(Operation of Foundry Sand Supply Device)

The foundry sand supply device 1 can operate the bucket drive unit 3 and the moving unit 4 at an arbitrary timing. Consequently, the foundry sand supply device 1 can collect the foundry sand S at an arbitrary timing. On the other hand, it may be necessary to collect the foundry sand S at a timing when the conveyance by the conveyor 20 is interrupted, depending on inspection content of the inspection device or a manufacturing process of the molding machine. In this case, the control unit 6 obtains operation information of the conveyor 20, and operates the bucket drive unit 3 and the moving unit 4 based on the operation information during the interruption of the conveyance of the conveyor 20. Hereinafter, a collecting operation of the foundry sand S during the interruption of the conveyance will be described.

Figure 2:
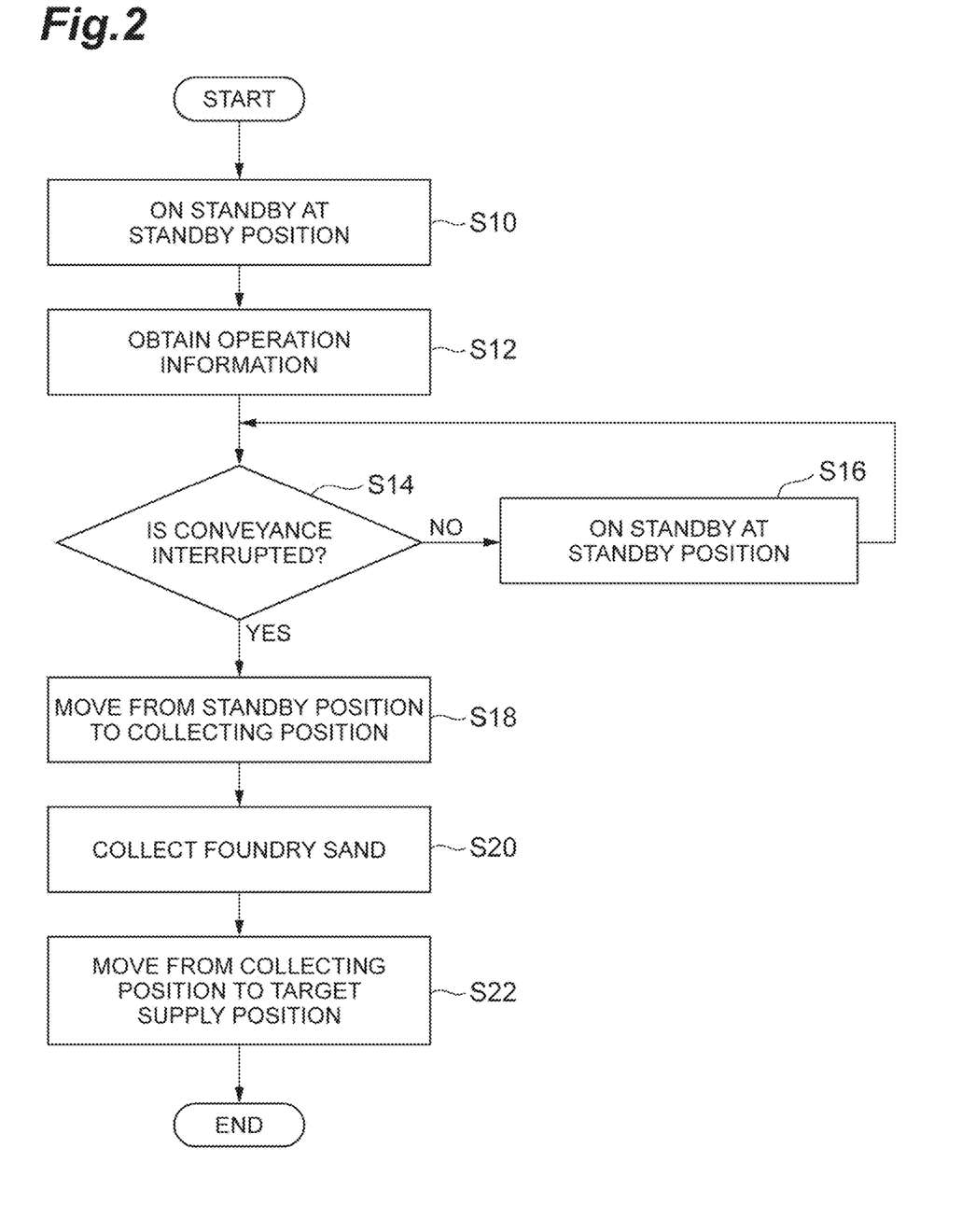
FIG. 2 is a flowchart showing an example of a foundry sand collection method according to the embodiment.

FIG. 2 is a flowchart showing an example of a foundry sand collection method according to the embodiment. The flowchart shown in FIG. 2 is started, for example, when the control unit 6 accepts an operation instruction made by a host control system. As shown in FIG. 2, first, the bucket drive unit 3 is on standby at a standby position (step S10). The bucket drive unit 3 is located at the standby position from start of processing, and the bucket 2 is on standby at a position away from the foundry sand S. Subsequently, the control unit 6 obtains the operation information of the conveyor 20 from the conveyance control unit 21 (step S12). An example of the operation information of the conveyor 20 is information indicating that the conveyor 20 is operating.

Subsequently, the control unit 6 determines whether the conveyance of the foundry sand S by the conveyor 20 is interrupted, based on the operation information obtained in the step S12 (step S14). The operation information includes, as an example, the information indicating that the conveyor 20 is operating. The control unit 6 determines a timing when the conveyor 20 is operated and a timing when the operation of the conveyor 20 ends, and determines whether the conveyance is interrupted by the conveyor 20.

The control unit 6 puts the bucket drive unit 3 on standby at the standby position when it is determined that the conveyance of the foundry sand S by the conveyor 20 is not interrupted (step S16). Consequently, the bucket drive unit 3 is on standby at the standby position until the control unit 6 determines that the conveyance of the foundry sand S is interrupted. The control unit 6 operates the moving unit 4 and linearly moves the bucket drive unit 3 from the standby position to the collecting position when it is determined that the conveyance of the foundry sand S by the conveyor 20 is interrupted (step S18). The control unit 6 operates the bucket drive unit 3 in case where the bucket drive unit 3 reaches the collecting position. Consequently, the bucket 2 collects the foundry sand S (step S20). Subsequently, the control unit 6 operates the moving unit 4, and linearly moves the bucket drive unit 3 from the collecting position to the supply position that is a target (step S22). The control unit 6 operates the bucket drive unit 3 in case where the bucket drive unit 3 reaches the supply position. Consequently, the control unit 6 can drop the foundry sand S from the bucket 2 to supply the foundry sand S to the external device 30.

If the step S22 ends, the flowchart shown in FIG. 2 ends. When the flowchart shown in FIG. 2 is executed, the foundry sand supply device 1 can collect the foundry sand S during the interruption of the conveyance.

(Another Use Mode of Foundry Sand Supply Device)

Figure 3:
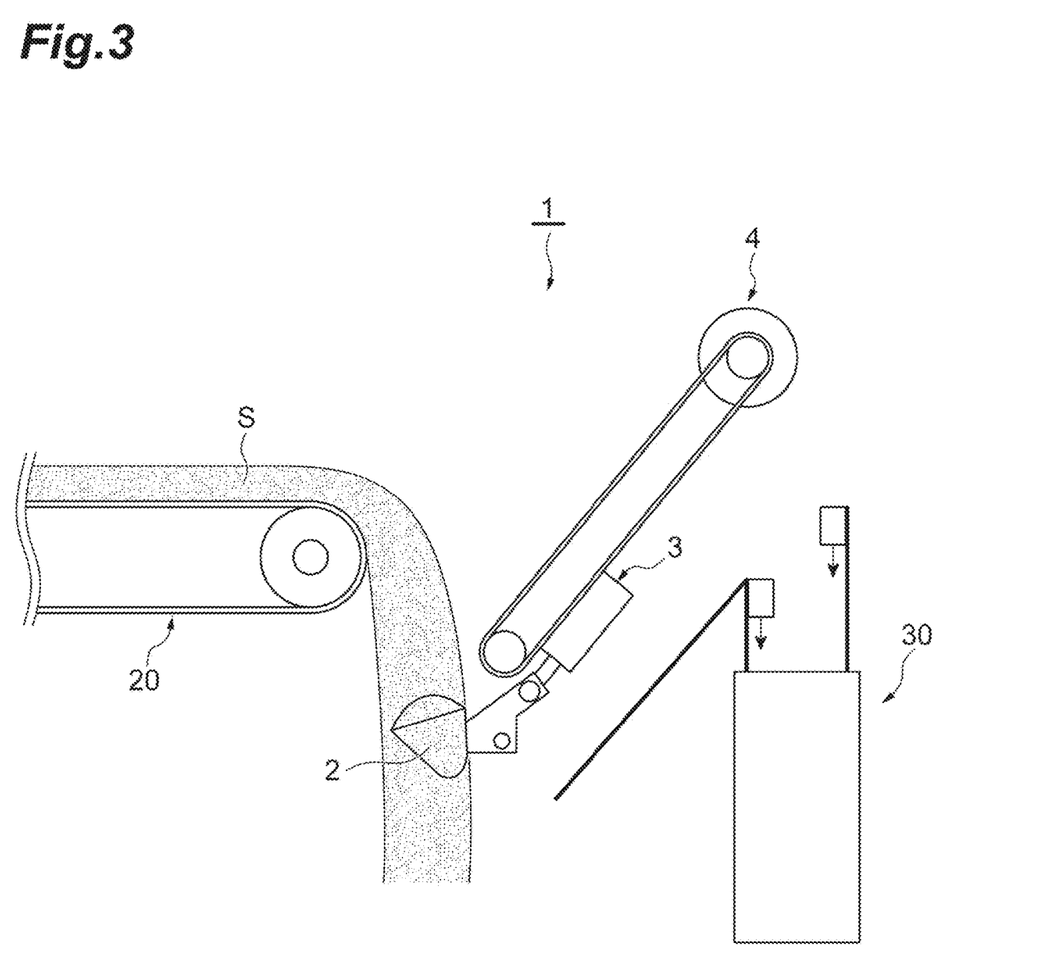
FIG. 3 is an explanatory view of a use example of the foundry sand supply device according to the embodiment.
Figure 4:
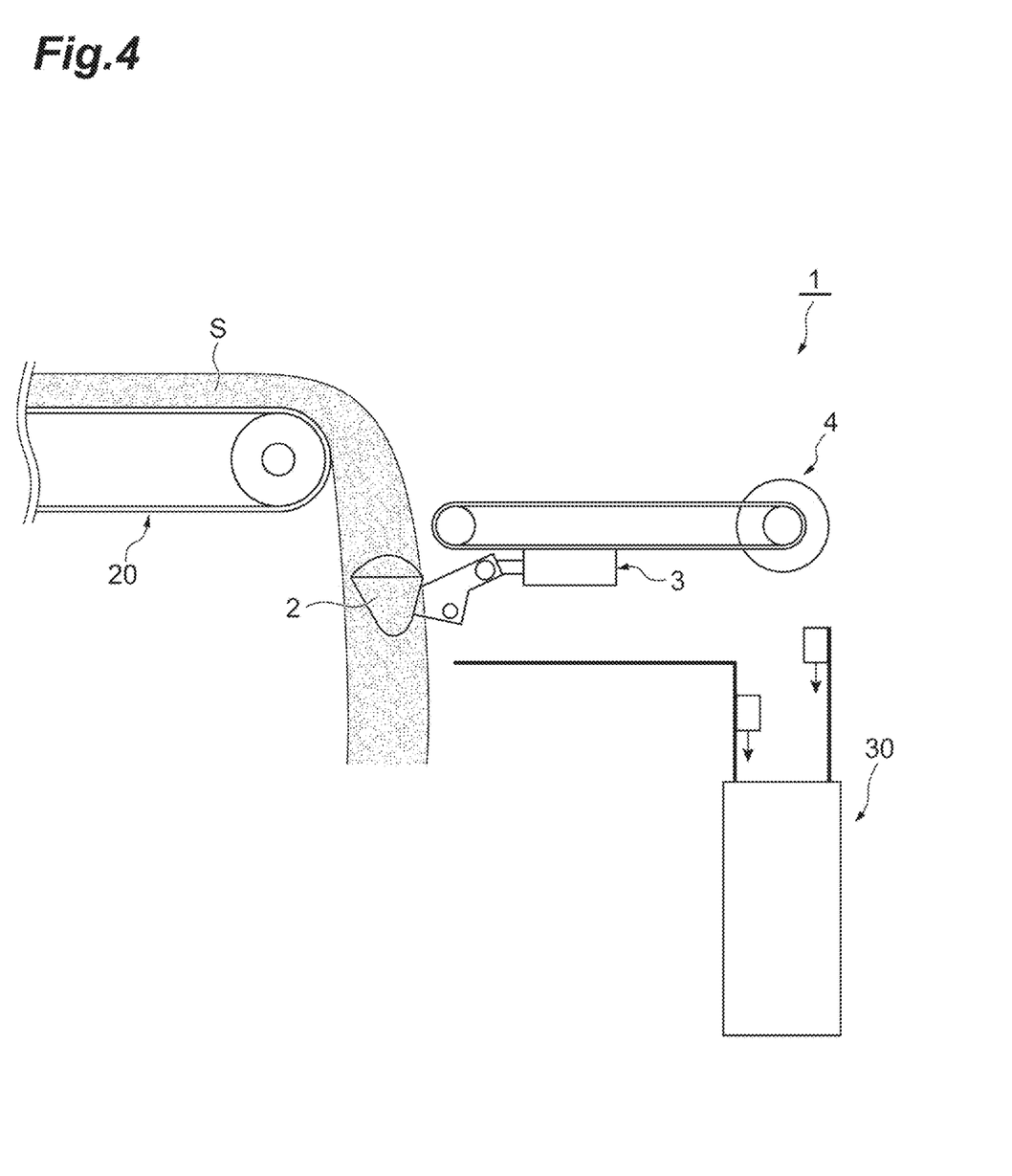
FIG. 4 is an explanatory view of a use example of the foundry sand supply device according to the embodiment.

The foundry sand supply device 1 is usable not only in collecting the foundry sand S that is present on the conveyor 20 but also in various modes. FIG. 3 is an explanatory view of a use example of the foundry sand supply device according to the embodiment. As shown in FIG. 3, the foundry sand supply device 1 may be disposed near an end of the conveyor 20, and operated in such a way as to scoop, with the bucket 2, the foundry sand S dropping from the conveyor 20. The foundry sand supply device 1 includes the bucket drive unit 3 and the moving unit 4, and an angle of the bucket 2 can be adjusted to the same angle relative to a dropping direction of the sand every time. Consequently, unlike a case where the device only includes the moving unit, a constant amount of sand can be acquired every time. FIG. 4 is an explanatory view of a use example of the foundry sand supply device according to the embodiment. The foundry sand supply device 1 shown in FIG. 4 is different from the foundry sand supply device 1 shown in FIG. 3 in that the moving unit 4 extends in a horizontal direction, and the moving unit 4 moves the bucket drive unit 3 in the horizontal direction, and the devices are the same in other respects. As shown in FIGS. 3 and 4, the moving unit 4 can set the moving direction of the bucket drive unit 3 to an arbitrary direction.

Figure 5:
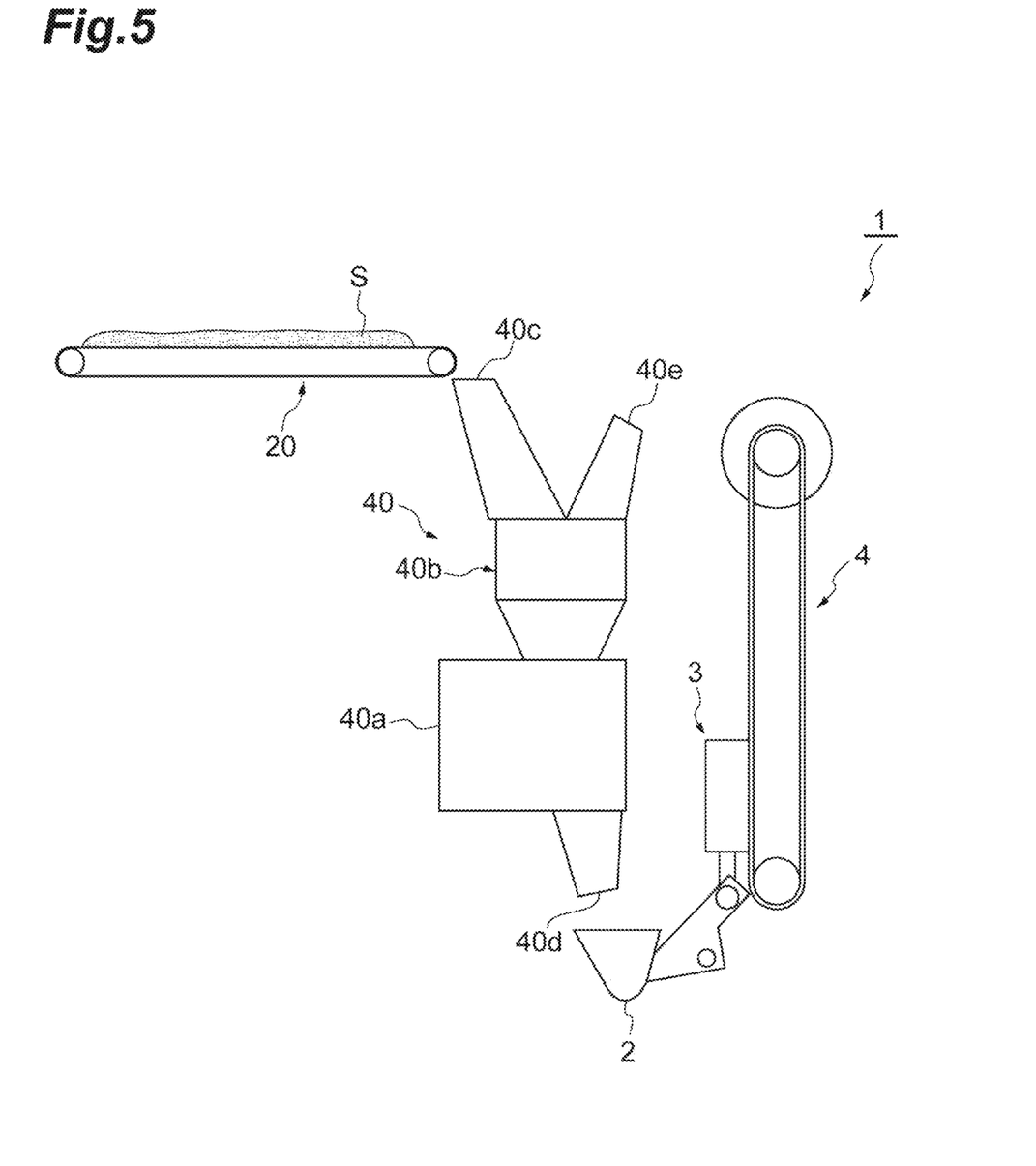
FIG. 5 is an explanatory view of a use example of the foundry sand supply device according to the embodiment.

FIG. 5 is an explanatory view of a use example of the foundry sand supply device according to the embodiment. In the present example, core sand is used as the foundry sand S. As shown in FIG. 5, the conveyor 20 supplies the foundry sand S to an external device 40. An example of the external device 40 is a core molding machine. The external device 40 receives the foundry sand S from a first throw port 40c of a hopper 40b provided in a top of a molding machine body 40a, and molds a core by using the foundry sand S in the molding machine body 40a. The foundry sand S left over during the molding (the core sand to be discharged) is discharged from a discharge port 40d that is a lower part of the molding machine. The foundry sand supply device 1 receives, with the bucket 2, the foundry sand S dropped from the discharge port 40d. The foundry sand supply device 1 drives the moving unit 4 to linearly move the bucket 2 to a second throw port 40e of the hopper 40b when a predetermined amount of the foundry sand S is stored in the bucket 2. Then, the foundry sand supply device 1 operates the bucket drive unit 3 to throw the foundry sand S into the second throw port 40e. The foundry sand supply device 1 includes the bucket drive unit 3 and the moving unit 4, and an angle of the bucket 2 can be adjusted in such a way as to horizontally dispose an open surface of the bucket 2. Consequently, unlike the case where the device only includes the moving unit, sand spill from the bucket 2 can be inhibited.

(System)

The foundry sand supply device 1 may be provided as a system combined with the above described external device 30 or 40. Hereinafter, the system comprising the external device 30 will be described. More specifically, description will be made as to a foundry sand inspection system 100 in which the external device 30 is the inspection device. An example of the foundry sand inspection system 100 inspects the foundry sand S for use in a foundry molding machine. In this case, the conveyor 20 may be a belt conveyor disposed above the foundry molding machine to supply the foundry sand S to the foundry molding machine. An example of the foundry molding machine is a molding machine with frames for upper frame/lower frame alternate molding. The belt conveyor is operated for each frame molding, and the foundry sand S for one frame is supplied to the foundry molding machine. An example of the foundry sand supply device 1 collects the foundry sand S from the belt conveyor to supply the foundry sand S to the inspection device every time during conveyance or interruption of the conveyance of the foundry sand S for the lower frame by the belt conveyor.

The inspection device that is an example of the external device 30 includes the chute 30b, and the processing unit 30a (an example of an inspection unit) as shown in FIG. 1. The processing unit 30a inspects properties of the foundry sand S dropped from the chute 30b. As a specific example, the processing unit 30a measures moisture, compactability (CB) value, compressive strength, air permeability and sand temperature of the foundry sand S.

Figure 6A:
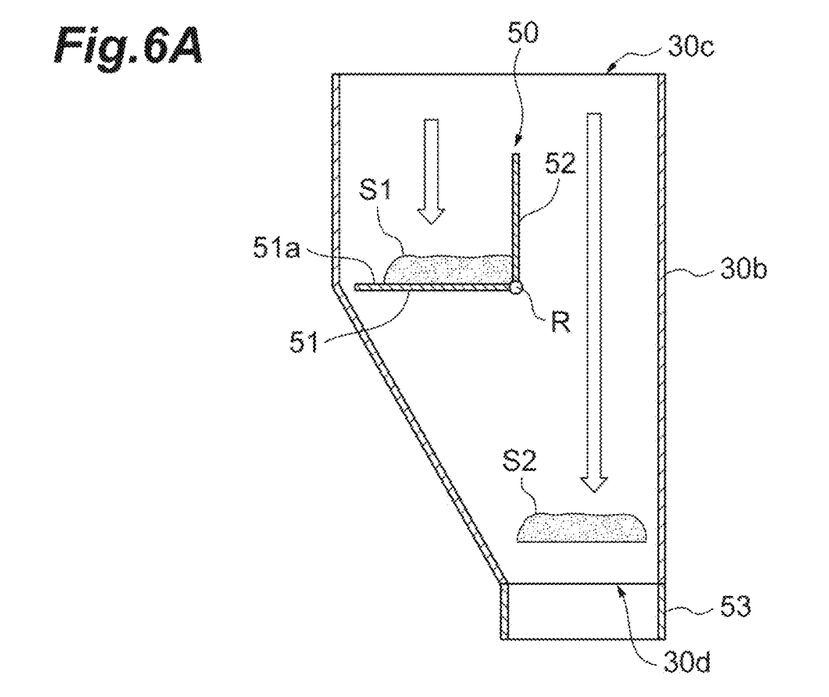
FIGS. 6A and 6B are an explanatory view of examples of an opening/closing gate of an inspection device.
Figure 6B:
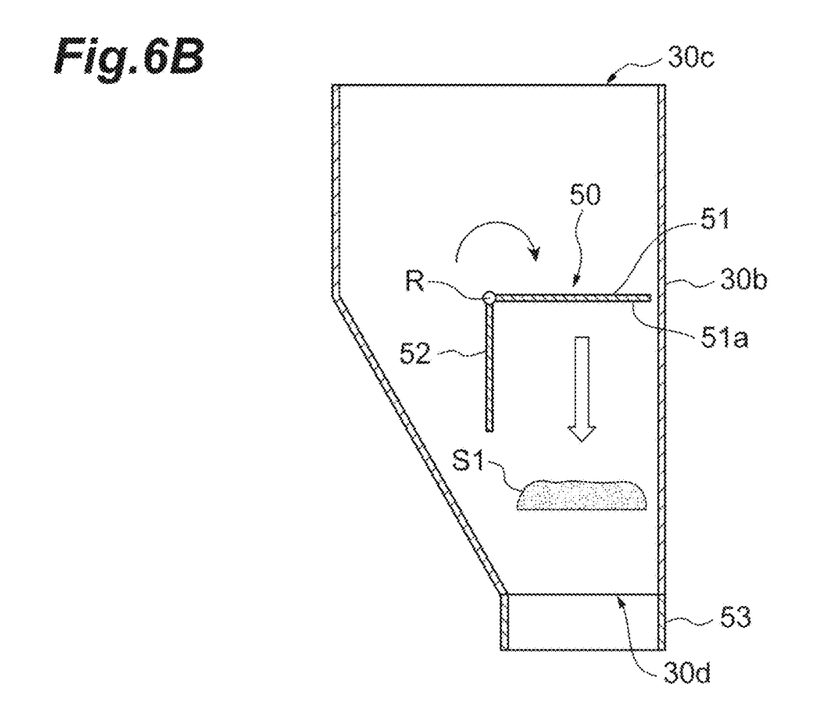

The inspection device includes a mechanism to measure the foundry sand S received at once from the bucket 2 as many as a plurality of divided times. FIGS. 6A and 6B are an explanatory view of examples of an opening/closing gate of the inspection device. As shown in FIG. 6A, the chute 30b of the inspection device includes an opening/closing gate 50 in the chute. The opening/closing gate 50 includes a first plate member 51. An upper surface of the first plate member 51 is a receiving surface 51a that receives dropping foundry sand. A second plate member 52 is vertically provided at an end of the first plate member 51. A rotary shaft R extending along and within a plane of the receiving surface 51a is provided at a connection point between the first plate member 51 and the second plate member 52, and the opening/closing gate 50 is rotatably supported about the rotary shaft R. An example of the rotary shaft R is a rod part of a rotating cylinder. The rotary shaft R is located almost in a center of a space in the chute 30b.

The opening/closing gate 50, when disposed in a horizontal posture and upward, receives foundry sand S1 of part of the foundry sand S2 thrown inside, and passes remaining foundry sand S through the sand discharge port 30d of the chute 30b. That is, an area of the receiving surface 51a is set to be smaller than a cross section of an internal space of the chute 30b. In FIGS. 6A and 6B, the area of the receiving surface 51a is set to an about half of the cross section of the internal space of the chute 30b. Consequently, the foundry sand S thrown inside can be divided into two approximately equal portions. The second plate member 52 is provided to prevent dropping of the foundry sand S1 received by the receiving surface 51a.

After inspection of the foundry sand S2 ends, the opening/closing gate 50 rotates 180° about the rotary shaft R. When the opening/closing gate 50 rotates 180° about the rotary shaft R, as shown in FIG. 6B, the receiving surface 51a turns downward, and the foundry sand S1 disposed on the receiving surface 51a drops, and is supplied to the inspection device.

The receiving surface 51a may be disposed so that the receiving surface 51a is not superimposed over the sand discharge port 30d as seen from the sand throw port 30c. In this case, the first dropped foundry sand S2 and the next dropped foundry sand S1 have the same trajectory of the drop, and hence an influence on evaluation of properties of the foundry sand S can be minimized. Furthermore, the foundry sand does not enter the space just under the opening/ closing gate 50, and hence piling of the sand on an inner wall surface of the chute 30*b* does not have to be taken into consideration. Consequently, the chute 30*b* does not have to be formed in such a tapered shape as shown in the drawing, and a size of the chute 30*b* can be more compact.

Furthermore, the inspection device may be provided with a sand loosening mechanism that loosens the foundry sand S before the foundry sand S is supplied to the processing unit 30*a*. For example, as shown in FIGS. 6A and 6B, a sand loosening mechanism 53 is provided in the sand discharge port 30*d* of the chute 30*b*.

Figure 7:
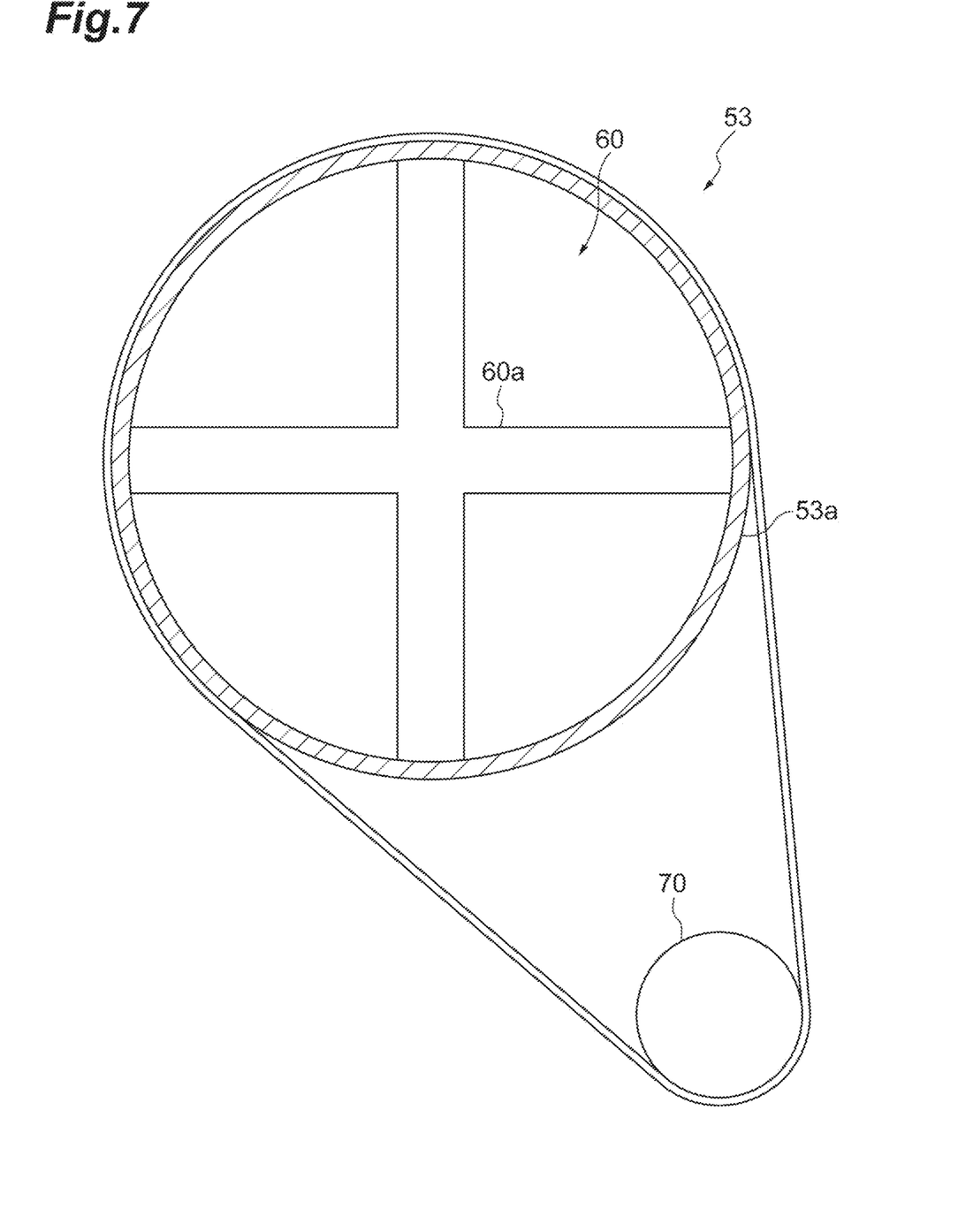
FIG. 7 is an explanatory view of an example of a sand loosening mechanism of the inspection device.

FIG. 7 is an explanatory view of an example of the sand loosening mechanism of the inspection device. As shown in FIG. 7, the sand loosening mechanism 53 includes a hollow cylindrical case 53*a* having opposite end faces opened, and in internal 60 of the cylindrical case 53*a*, disposed is a rotating blade 60*a* fixed to an inner surface of the cylindrical case 53*a*. The cylindrical case 53*a* is connected to a drive source 70 via a belt, and rotating power is applied. The cylindrical case 53*a* rotates to rotate the rotating blade 60*a*, and the rotating blade 60*a* abuts on the dropped foundry sand S, so that a lump of foundry sand S (a sand lump) can be loosened.

(Summary of Embodiment)

In the foundry sand supply device 1, the bucket 2 is driven by the bucket drive unit 3 rotatably supporting the bucket 2. Then, the bucket 2 is moved close to and away from the foundry sand S together with the bucket drive unit 3 by the moving unit 4, and linearly moves between the collecting position P1 and the supply position P2. Consequently, this foundry sand supply device 1 not only includes the moving unit 4 linearly moving the bucket 2 between the collecting position P1 and the supply position P2 but also includes the bucket drive unit 3 driving the bucket 2 itself, and hence the foundry sand S can be actively collected. Consequently, the foundry sand supply device 1 can collect the foundry sand S at the arbitrary timing irrespective of a conveying state of the foundry sand S. Further, the foundry sand supply device 1 can freely drop the foundry sand from the bucket 2 driven by the bucket drive unit 3 to supply the foundry sand. As a result, it is possible to prevent the foundry sand from solidifying, and the properties of the foundry sand are less likely to change.

The foundry sand supply device 1 can not only receive, with the bucket 2, the foundry sand S moved by the conveyor 20 being operated but also collect the foundry sand S on the conveyor 20 where conveyance is interrupted. The foundry sand supply device 1 can collect the foundry sand S also during the interruption of the conveyance of the conveyor 20.

In the foundry sand supply device 1, unlike a case where a bucket is placed in a sand layer of flowing foundry sand S to collect the foundry sand S, a problem that the sand is tamped is hard to occur, and an influence on a post-process can be reduced. The foundry sand supply device 1 can collect the foundry sand S during the interruption of the conveyance of the conveyor 20, and hence wear on the bucket 2 can be inhibited.

The foundry sand inspection system 100 includes the foundry sand supply device 1, and hence the foundry sand S can be collected at the arbitrary timing irrespective of the conveying state of the foundry sand S. The foundry sand inspection system 100 includes the opening/closing gate 50, and hence also in case where the foundry sand S is conveyed with the bucket 2 at once, the foundry sand S can be inspected two divided times.

As above, various illustrative embodiments have been described, but the above described illustrative embodiments are not restrictive, and may be variously omitted, replaced, and modified.

REFERENCE SIGNS LIST

1 . . . foundry sand supply device, 2 . . . bucket, 3 . . . bucket drive unit, 4 . . . moving unit, 5 . . . blower, 6 . . . control unit, 20 . . . conveyor, 30 and 40 . . . external device, 30*b* . . . chute, 30*c* . . . sand throw port, 30*d* . . . sand discharge port, 50 . . . opening/closing gate, 51*a* . . . receiving surface, 53 . . . sand loosening mechanism, and 100 . . . foundry sand inspection system.

What is claimed is:

1. A foundry sand supply device comprising:
a bucket configured to collect foundry sand;
a bucket drive unit comprising a rotary shaft to which the bucket is rotatably attached such that the bucket drive unit rotatably supports the bucket and is configured to drive the bucket; and
a moving unit configured to move the bucket drive unit close to and away from the foundry sand, and configured to linearly move the bucket drive unit between a collecting position to collect the foundry sand and a supply position to supply the foundry sand.

2. The foundry sand supply device according to claim 1, wherein the bucket is configured to collect the foundry sand disposed on a conveyor.

3. The foundry sand supply device according to claim 2, comprising
a control unit configured to control operations of the bucket drive unit and the moving unit, wherein the control unit obtains operation information of the conveyor, and operates the bucket drive unit and the moving unit based on the operation information during interruption of conveyance of the conveyor.

4. The foundry sand supply device according to claim 3, wherein the bucket drive unit is a cylinder driving a rod, and
the bucket is supported by a tip of the rod.

5. The foundry sand supply device according to claim 4, comprising
a blower configured to output a gas toward an interior of the bucket.

6. The foundry sand supply device according to claim 3, comprising
a blower configured to output a gas toward an interior of the bucket.

7. The foundry sand supply device according to claim 3, wherein the moving unit moves the bucket drive unit to the supply position, and
the bucket drive unit drives the bucket at the supply position to supply the foundry sand to a sand throw port of an external device.

8. The foundry sand supply device according to claim 2, wherein the bucket drive unit is a cylinder driving a rod, and
the bucket is supported by a tip of the rod.

9. The foundry sand supply device according to claim 8, comprising
a blower configured to output a gas toward an interior of the bucket.

10. The foundry sand supply device according to claim 2, comprising
a blower configured to output a gas toward an interior of the bucket.

11. The foundry sand supply device according to claim 2, wherein the moving unit moves the bucket drive unit to the supply position, and the bucket drive unit drives the bucket at the supply position to supply the foundry sand to a sand throw port of an external device.

12. The foundry sand supply device according to claim 1, wherein the bucket drive unit is a cylinder driving a rod, and the bucket is supported by a tip of the rod.

13. The foundry sand supply device according to claim 12, comprising a blower configured to output a gas toward an interior of the bucket.

14. The foundry sand supply device according to claim 12, wherein the moving unit moves the bucket drive unit to the supply position, and the bucket drive unit drives the bucket at the supply position to supply the foundry sand to a sand throw port of an external device.

15. The foundry sand supply device according to claim 1, comprising a blower configured to output a gas toward an interior of the bucket.

16. The foundry sand supply device according to claim 1, wherein the moving unit moves the bucket drive unit to the supply position, and the bucket drive unit drives the bucket at the supply position to supply the foundry sand to a sand throw port of an external device.

* * * * *